(12) United States Patent
Conklin et al.

(10) Patent No.: US 8,306,420 B2
(45) Date of Patent: Nov. 6, 2012

(54) OPTICAL NETWORK REAL TIME LATENCY MEASUREMENT SYSTEMS AND METHODS

(75) Inventors: Richard W. Conklin, Gainesville, GA (US); Matthew Connolly, Canton, GA (US); Jeffery Thomas Nichols, Marietta, GA (US)

(73) Assignee: Ciena Corporation, Hanover, MD (US)

( * ) Notice: Subject to any disclaimer, the term of this patent is extended or adjusted under 35 U.S.C. 154(b) by 359 days.

(21) Appl. No.: 12/684,457

(22) Filed: Jan. 8, 2010

(65) Prior Publication Data
US 2011/0170859 A1    Jul. 14, 2011

(51) Int. Cl.
*H04J 14/00* (2006.01)
(52) U.S. Cl. ................ 398/53; 398/52; 398/75
(58) Field of Classification Search .......... 398/25–29, 398/35, 47, 75–77, 52–53
See application file for complete search history.

(56) References Cited

U.S. PATENT DOCUMENTS

| | | | |
|---|---|---|---|
| 5,481,538 A * | 1/1996 | Yang et al. ................ 370/456 | |
| 7,418,639 B2 | 8/2008 | Natarajan | |
| 7,685,270 B1 * | 3/2010 | Vermeulen et al. .......... 709/224 |
| 2005/0135257 A1 * | 6/2005 | Stephens et al. ............. 370/241 |
| 2008/0013531 A1 * | 1/2008 | Elliott et al. ................. 370/356 |
| 2009/0067338 A1 | 3/2009 | Pan |
| 2009/0162052 A1 | 6/2009 | Xia et al. |
| 2011/0047211 A1 * | 2/2011 | Makhija et al. ............... 709/203 |

* cited by examiner

*Primary Examiner* — Dzung Tran
(74) *Attorney, Agent, or Firm* — Clements Bernard PLLC; Christopher L. Bernard; Lawrence A. Baratta, Jr.

(57) ABSTRACT

The present disclosure provides systems and methods for real-time, in-service latency measurements over optical links that may be further integrated within various optical control planes. The present invention may utilize minimal unused overhead to calculate latency of an optical line through a transport network. The present invention utilizes timers at two end-point nodes associated with the optical line, and includes a mechanism to filter out frame skew between the nodes. Advantageously, the present invention provides a highly accurate latency measurement that may calculate latency on links as small as one meter, an in-service algorithm operable without network impact, and may be integrated with an optical control plane to automatically provide administrative weight variables associated with link costs.

19 Claims, 6 Drawing Sheets

OPTICAL NETWORK REAL TIME LATENCY MEASUREMENT SYSTEMS AND METHODS

FIELD OF THE INVENTION

The present invention relates generally to optical networks. More particularly, the present invention relates to systems and methods for real-time, in-service latency measurements over optical links that may be further integrated within various optical control planes.

BACKGROUND OF THE INVENTION

Conventionally, in order to guarantee network service level agreements (SLAs) it is often desirable to know the latency for a given service or link. This has typically been critical in higher latency store and forward packet technologies—namely Internet Protocol (IP), Ethernet and Multi-Protocol Label Switching (MPLS). For example, an IP network will use Ping and Trace-route to determine latency; other methods involve time stamped probe packets, or marking protocol data unit (PDU) overhead for real time measurements. Because of the intrinsic low latency and deterministic routing in optical transport networks such as G.709 Optical Transport Network (OTN) and SONET/SDH, measuring real time latency has been historically less critical than in high latency packet networks. Conventionally, the static nature of these networks allows a network operator to enter the latency for a link upon provisioning and typically no further updates are required on that link for the life of the network.

Most in-situ latency measurements are packet based. Latency measurements for SONET/SDH and OTN (TDM) networks has typically been pre-calculated based on topology, physical distance, or pre-determined using external measuring equipment. This method has been sufficient for time division multiplexed (TDM) networks when the topology is static or deterministic. In self healing mesh networks however, in particular hierarchical mesh networks, the topology can change. For example, optical switching at the Dense Wave Division Multiplexed (DWDM) layer, or OTN server layer can result in a new latency value. Since it is impractical to measure the latency for all possible paths in the network, a method of in-situ measurement that can measure the latency for any path is desired.

BRIEF SUMMARY OF THE INVENTION

In an exemplary embodiment, a latency measurement method over an optical link includes issuing a latency measurement command at a first node to a second node and starting a first timer; receiving the latency measurement command at the second node and starting a second timer; stopping the second timer and issuing a latency measurement response at the second node to the first node; receiving the latency measurement response at the first node and stopping the first timer; and calculating latency between the first node and the second node based on the first timer and the second timer. The latency measurement method may further include transmitting a value of the second timer from the second node to the first node, wherein the calculating latency is performed at the first node. The calculating latency may be further based on a granularity derived from a bit rate of transmission between the first node and the second node. The first timer and the second time may be utilized in the calculating latency to remove frame skew associated between the first node and the second node from the latency. The calculating latency may be based on a formula of:

$$\text{Latency} = \left(\frac{Timer_1 - Timer_2}{2}\right) \cdot TickGranularity$$

where $Timer_1$ is a value of the first timer, $Timer_2$ is a value of the second timer, and TickGranularity is derived from the bit rate. Optionally, the latency measurement method is performed in-service across the optical link. The latency measurement command and the latency measurement response may be transmitted in overhead associated with a transmission protocol. Also, the value of the second timer may be transmitted in overhead associated with a transmission protocol. Optionally, the latency measurement method may further include operating an optical network with at least the first node and the second node, wherein the optical network utilizes a signaling and routing protocol; and automatically setting administrative weights associated with a plurality of links in the optical network based upon latency measurements. Alternatively, the latency measurement method may further include operating the latency measurement method in-service utilizing overhead associated with a transmission protocol; and periodically adjusting the administrative weights based on updated latency measurements. Additionally, the latency measurement method may further include operating an optical network with at least the first node and the second node, wherein the optical network utilizes a signaling and routing protocol; operating the latency measurement method in-service utilizing overhead associated with a transmission protocol; automatically detecting a change in latency on clearing of a Signal Fail or a remote Signal Fail; and adjusting administrative weights based on the change in latency. Optionally, the latency measurement method may further include operating an optical network with at least the first node and the second node, wherein the optical network utilizes a signaling and routing protocol; operating the latency measurement method in-service utilizing overhead associated with a transmission protocol; and detecting significant latency difference between multiple lines on a same link. Alternatively, the latency measurement method may further include operating an optical network with at least the first node and the second node, wherein the optical network utilizes a signaling and routing protocol; operating the latency measurement method in-service utilizing overhead associated with a transmission protocol; and providing a line latency performance monitoring statistic.

In another exemplary embodiment, a network includes a plurality of nodes; a plurality of links interconnecting the plurality of nodes; a transmission protocol operating on the plurality of links between the plurality of nodes; and a real-time latency measurement algorithm configured to in-service measure latency of any of the plurality of links between any of the plurality of nodes filtering out frame skew between the plurality of nodes. The network may further include a signaling and routing protocol operating on the plurality of nodes, wherein the real-time latency measurement algorithm is configured to automatically provide administrative weights for each of the plurality of links and to periodically adjust the administrative weights based on updated measurements. The real-time latency measurement algorithm may transmit commands and timer values in minimal overhead associated with the transmission protocol.

In yet another exemplary embodiment, a network element includes a module including an optical transceiver connected to a transport network and framing circuitry configured to provide framing based on a transmission protocol; and a real-time latency measurement algorithm; wherein the module is configured to connect to a second module in a second network element over the transport network; and wherein the real-time latency measurement algorithm is configured to measure in-service and in real-time latency associated with a link formed by the module and the second module, and wherein the real-time latency measurement algorithm is further configured to filter out frame skew associated with the module and the second module. The real-time latency measurement algorithm may include the steps of issuing a latency measurement command at the module to the second module and starting a first timer, wherein the second module is configured to start a second timer upon receipt of the latency measurement command; receiving the latency measurement response and a value of the second time at the module and stopping the first timer; and calculating latency between the module and the second module based on the first timer and the second timer. The calculating latency may be based on a formula of:

$$\text{Latency} = \left(\frac{Timer_1 - Timer_2}{2}\right) \cdot TickGranularity$$

where $Timer_1$ is a value of the first timer, $Timer_2$ is a value of the second timer, and TickGranularity is derived from the bit rate. The network element may further include a signaling and routing protocol operating at the network element; wherein administrative weights associated with links connected to the optical transceiver are defined based on the real-time latency measurement algorithm.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention relates to systems and methods for real-time, in-service latency measurements over optical links that may be further integrated within various optical control planes. The present invention may utilize minimal unused overhead to calculate latency of an optical line through a transport network. The present invention utilizes timers at two end-point nodes associated with the optical line, and includes a mechanism to filter out frame skew between the nodes. Advantageously, the present invention provides a highly accurate latency measurement that may calculate latency on links as small as one meter, an in-service algorithm operable without network impact, and may be integrated with an optical control plane to automatically provide administrative weight variables associated with link costs.

Figure 1:
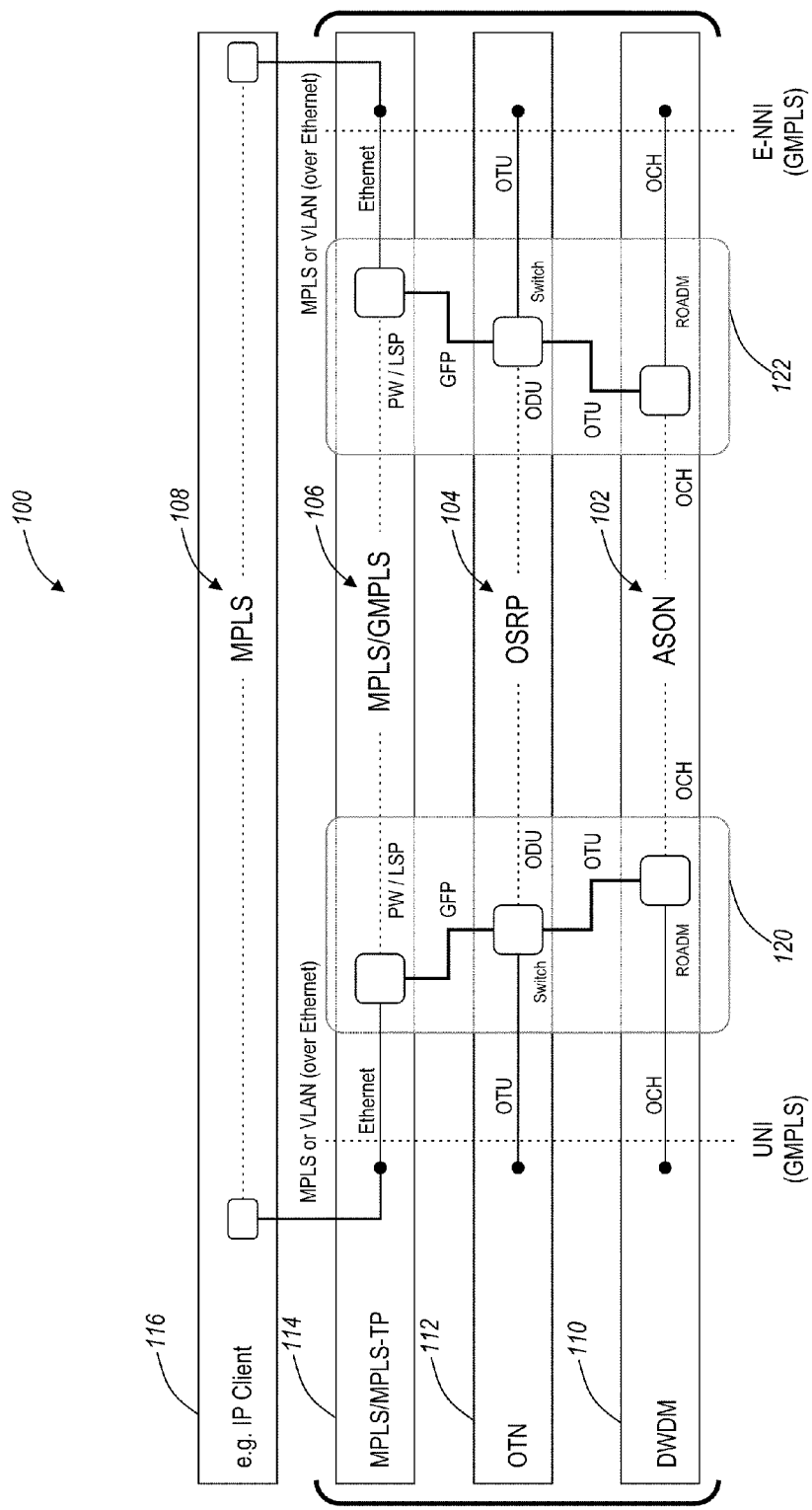
FIG. 1 is a diagram of a network with logical partitions of multi-layer control planes according to an exemplary embodiment of the present invention.

Referring to FIG. 1, in an exemplary embodiment, a network 100 is illustrated with logical partitions of multi-layer control planes 102, 104, 106, 108. The exemplary network 100 includes a dense wave division multiplexed layer 110 with a automatically switched optical network (ASON) control plane 102, an optical transport network (OTN) layer 112 with an optical switching and routing protocol (OSRP) control plane 104, a multi-protocol label switched (MPLS) layer 114 with an MPLS/Generalized-MPLS control plane 106, and an Internet protocol (IP) layer 116 with an MPLS control plane 108. The network 100 represents logical partitions of a typical network, and those of ordinary skill in the art will recognize networks may include other layers, control planes, components, and the like with the network 100 provided herein for illustration purposes. The logical partitions show the network at the control plane level omitting physical details such as fiber connections, intermediate nodes, network elements, and the like.

The network 100 includes two nodes 120, 122 interconnected at all of the layers 110, 112, 114, 116. In an exemplary embodiment, the DWDM layer 110 may include optical channel (OCH) connections routed using the ASON control plane 102, the OTN layer 112 may include optical channel transport units (OTU) routed using the OSRP control plane 104, the MPLS layer 114 may include Ethernet routed using the MPLS/GMPLS control plane 106. For example, the nodes 120, 122 may include network elements such as reconfigurable optical add-drop multiplexers (ROADMs), optical switches, and the like servicing the various layers. In addition to the hierarchical layers, the network 100 may include demarcation points using various protocols such as User-to-Network Interface (UNI) and External Network to Network Interface (E-NNI), etc. Thus, for connectivity between clients, there are separate control planes exist for different network layers. Switching at the server layer alters the latency at the client layer. It is therefore advantageous for each layer to independently measure latency in real time.

Figure 2:
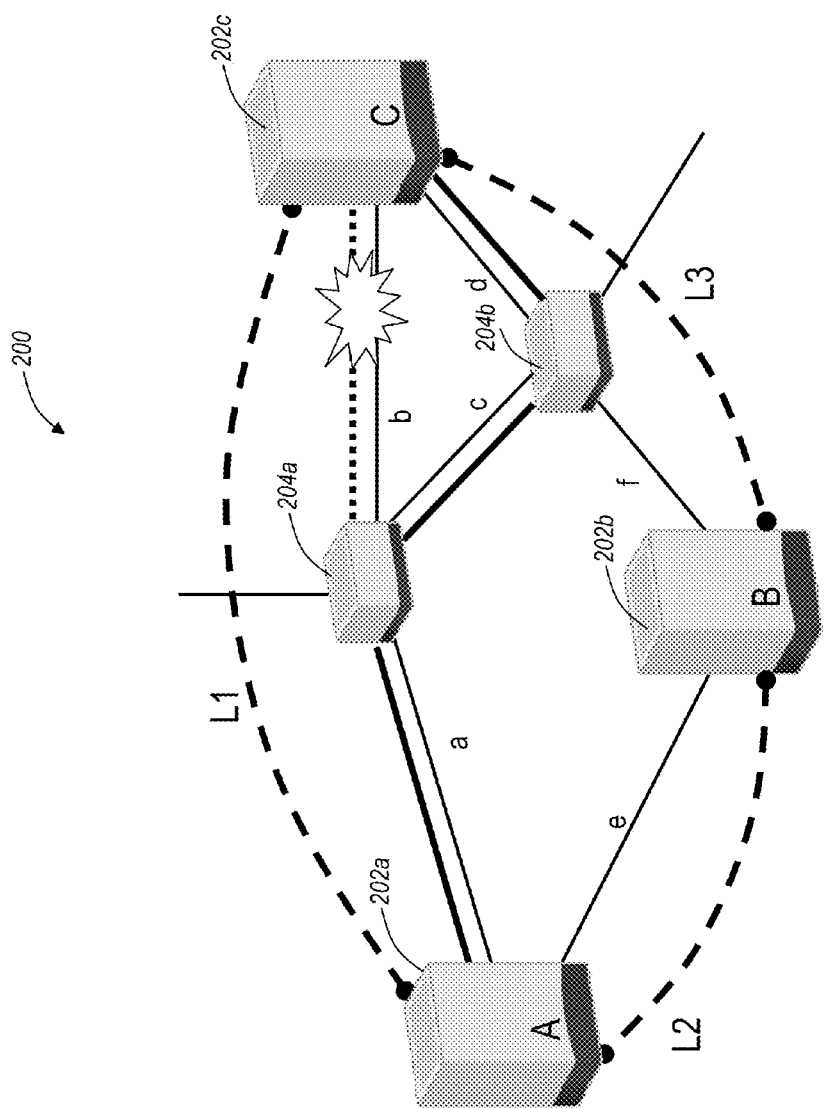
FIG. 2 is a diagram of an optical network operating a control plane for signaling and routing according to an exemplary embodiment of the present invention.

Referring to FIG. 2, in an exemplary embodiment, an optical network 200 is illustrated operating a control plane for signaling and routing. Specifically, the optical network 200 may include a variety of nodes, such as optical switches 202a, 202b, 202c, and ROADMs 204a, 204b. Note, the network 200 is illustrated with the switches 202 and ROADMs 204 for illustration purposes, and the present invention also contemplates any other node type, such as multi-service switching platforms (MSPPs), SONET/SDH ADMs, DWDM platforms, routers, switches, and the like. In describing the exemplary embodiments herein, reference is made to OSRP paths, links, legs, and lines. OSRP is a distributed protocol designed for controlling a network of optical cross-connects (OXCs). OSRP introduces intelligence in the control plane of an optical transport system. It can perform many functions such as automatic resource discovery, distributing network resource information, establishing and restoring connections dynamically across the network, and the like. However, the present invention is not limited to OSRP. Those skilled in the art will recognize that other intelligent signaling and routing protocols that can (or can be modified to) provide similar functionality as OSRP (e.g. automatically establishing and restoring connections across the network, and the like) are within the scope of embodiments of the invention. Examples of other protocols include Automatically Switched Optical Network (ASON), Generalized MPLS (G-MPLS), and the like.

OSRP provides route selection through a computation performed at the nodes 202, 204. For example, route selection can be optimized using Dijkstra's Algorithm which can find a shortest path from the ingress nodes to the egress node through the network 200 based on a least administrative cost or weight, subject to a set of user-defined constraints. For example, routing considerations can include latency, link capacity, connection type, line/path protection, restoration priority, explicit routes, maximum delay, reversion, connection preemption, transit delay, and the like. The network includes various links interconnecting each of the nodes 202, 204, i.e. links labeled a-f. The network 200 is illustrated with two OSRP routes between the switches 202a and the switch 202c, a first OSRP link labeled L1 and a second OSRP link labeled L2 and L3. For the first OSRP link, latency is measured for L1, determining the admin weight, and for the second OSRP link, latency is measured for each link (L2, L3), and summed for the total route latency/admin weight. The first OSRP route R1(L1) uses DWDM links a-b and has the lowest admin weight and is therefore the preferred route. The second OSRP router R2(L2, L3) is a secondary (protect) route. Assume a fault occurs on DWDM link b. The DWDM ROADM control plane reroutes R1(L1) to a-c-d. Using the systems and methods of the present invention, the latency for L1 may recalculated in real time between DWDM links a-c-d for L1, this changes the admin weight of R1(L1). Due to the increased admin weight, R1(L1) is no longer the preferred route, R2(L2,L3) is now selected as the preferred route since the total latency is lower.

Figure 3:
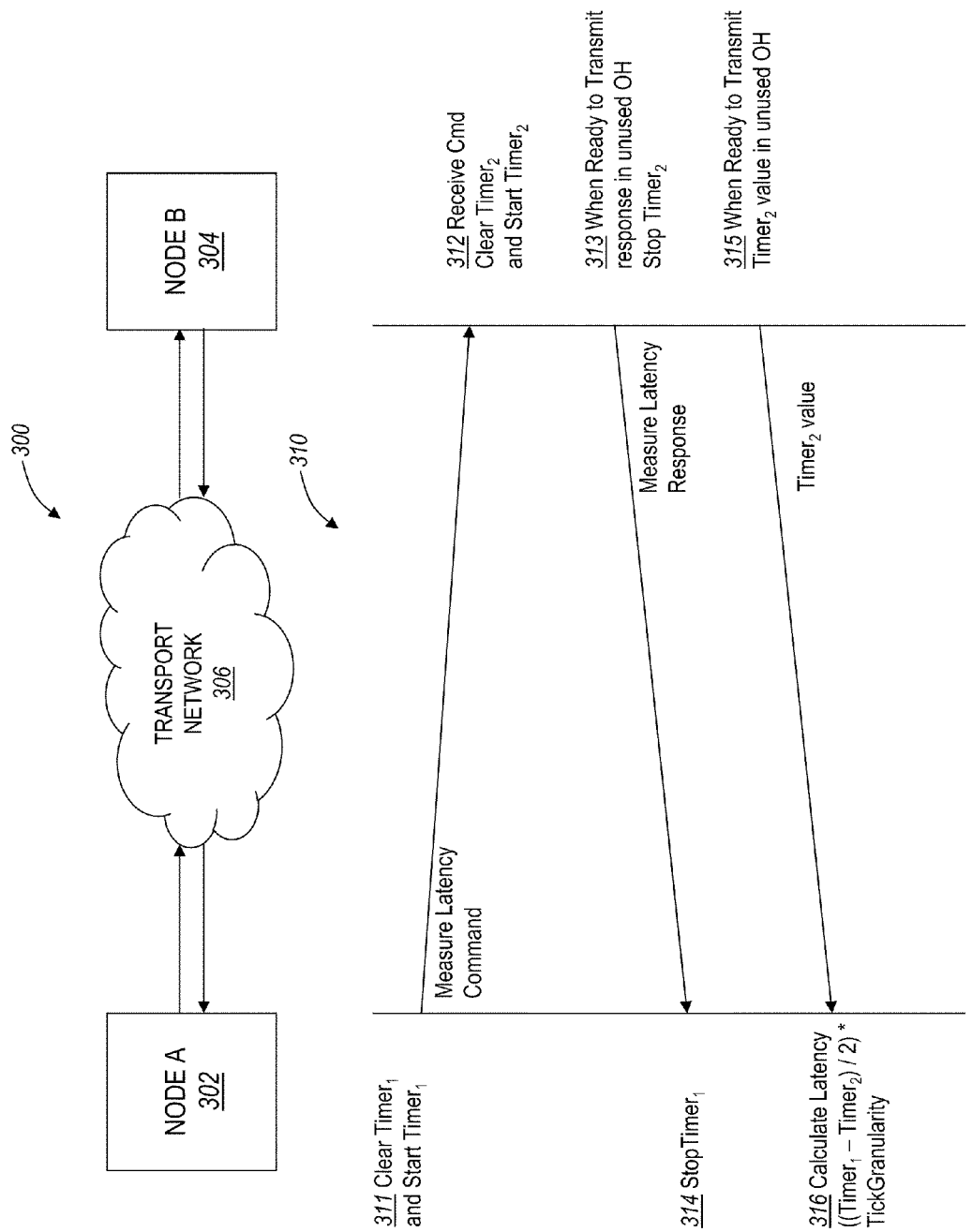
FIG. 3 is a diagram and flowchart of a network illustrating various steps associated with real-time latency measurements of the present invention.

Referring to FIG. 3, in an exemplary embodiment, a network 300 illustrates various steps associated with real-time latency measurements of the present invention. The network 300 includes a first node 302 interconnected to a second node 304 through a transport network 306. The nodes 302, 304 may include any optical network elements which utilize overhead for communication, such as DWDM terminals, SONET/SDH ADMs, Optical Cross-Connects (OXCs), and the like. The transport network 306 may include SONET, SDH, OTN, or the like. Advantageously, the present invention uses minimal overhead (e.g. line overhead) to calculate real-time latency of a line through the transport network 306 with an in-service calculation. Each of the nodes 302, 304 includes processing elements which are hardware devices for executing software instructions to calculate and compute real-time latency measurements, such as between the nodes 302, 304 through the transport network 306. The processing elements may include any custom made or commercially available processor, a central processing unit (CPU), an auxiliary processor among several processors, a semiconductor-based microprocessor (in the form of a microchip or chip set), an application specific integrated circuit (ASIC), a field programmable gate array (FPGA), or generally any device for executing software instructions.

The real-time latency measurements of the present invention uses minimal unused overhead (e.g. line overhead) to calculate the latency of a line through the transport network with an in-service calculation. In an exemplary embodiment, a real-time latency measurement 310 is initiated at one node, e.g. the node 302), to measure latency of a link across the transport network 306. The measurement may be initiated manually by an operator, automatically through a network management system (NMS) or the like, automatically based on a control plane request, or the like. For example, the control plane may request real-time measurements responsive to changes in the network 306 (e.g. modified routes, links, etc.). Upon initiation of the latency measurement 310, at the node 302, a first timer, $timer_1$, is cleared and started (step 311) while the node 302 concurrently sends a latency measure command to the peer node 304, i.e. in overhead on the transport network 306. Next, the node 304 receives the latency measure command and clears a second timer, $timer_2$, and starts the second timer (step 312). The key is that the node 302 starts the first timer and the node 304 starts the second timer so the latency measurement 310 can filter out the frame skew between the nodes 302, 304 (i.e. the nodes 302, 304 are running off synchronized clocks (i.e. building integrated timing supply (BITS)) or nearly synchronous clocks (in certain OTN cases)). The frame skew problem arises because the nodes 302, 304 may be launching frames at very different times (as much as 125 μs in the case of SONET/SDH).

The node 304 starts the second timer when it receives the measure latency command, and stops the second time when it is ready to transmit a response in unused overhead (step 313). The node 302 has the first timer running, and stops the first timer when it receives the response from the node 304 (step 314). Note, the response may simply be an indication that each node 302, 304 is operating a timer for measuring latency. Subsequently, the node 304 transmits the value of the second time in unused overhead to the node 302 (step 315). Note, as described herein, the unused overhead may include vendor-specific, undefined, etc. bytes in OTN, SONET, and/or SDH frames. Alternatively, the values may be transmitted in the data communication channel (DCC) bytes or the like. Finally, the node 302 receives the value of the second timer and has the value of the first timer to calculate latency of the link over the transport network 306 (step 316). The latency calculation is calculated by the following formula:

$$Latency = \left(\frac{Timer_1 - Timer_2}{2}\right) \cdot TickGranularity$$

The node 302 calculates the latency as $timer_1-timer_2$ and the node 302 then divides the value by 2 (because the timer measurement measures latency from the node 302 to the node 304 and also from the node 304 to the node 302. The result is a tick count. The tick count is multiplied by a granularity derived from the bit rate, e.g. 10 Gb/s, 40 Gb/s, 100 Gb/s, etc. The timer granularity is on the order of 6 ns. The speed of light is approximately $3 \times 10^8$ m/s through a vacuum or $2 \times 10^8$ m/s through a fiber. That results to about 0.2 meters per nanosecond. With a 6 ns timer, the latency measurement 310 can measure latency differences across fibers where the fibers differ by as little as 1.2 meters.

Note, in the example of FIG. 3, both the nodes 302, 304 are equipped with functionality to perform the latency measurement 310. In another exemplary embodiment, the node 302 may perform the latency measurement 310 without requiring the node 304 to be equipped with the functionality. Here, the latency measurement 310 can be extended to detect latency using remote-end unframed-facility loopback in the case where the peer equipment does not support the latency measurement 310 (although this would be during out-of-service "in test" condition).

The latency measurement 310 may be utilized for various applications in optical networks, such as automatically setting or adjusting the admin weight based on the latency of the transport network 306. As described above, various signaling and routing protocols (e.g. OSRP) utilize an admin weight for each link in determining routes, protection links, etc. In one exemplary embodiment, the latency measurement 310 may be integrated within the signaling and routing protocols to provide an automatic calculation of admin weight for every link in the transport network 306. This removes requirements for network operators to assign weights, and may be periodically updated in real-time without impacting network performance. This is an advantageous aspect useful in mesh network applications. In another exemplary application, the latency measurement 310 may be utilized for automatically detecting a change in latency on clear of Signal Fail or remote Signal Fail. This can allow detection in changes in latency of various links due to optical layer protection switch activity, thus changing admin weight in the transport network 306. This is also an advantageous aspect useful in mesh network applications. Also, the latency measurement 310 may provide automatic detection of significant latency differences between multiple lines in a link. Note, a link may include the same path over the transport network 306 of various different lines, and differing latency values for the lines over the same link may be indicative of a problem. Additionally, the latency measurement 310 may be used to provide performance monitoring (PM) for line latency, i.e. an additional PM value for reporting and monitoring performance of the transport network 306. For example, this may be useful in scenarios where latency is important to an end user or application, the latency measurement 310 may automatically report or alarm the detected latency for customer verification or service layer agreement (SLA) enforcement. Examples may include low-latency communication applications (e.g. military, stock market, etc.).

Figure 4:
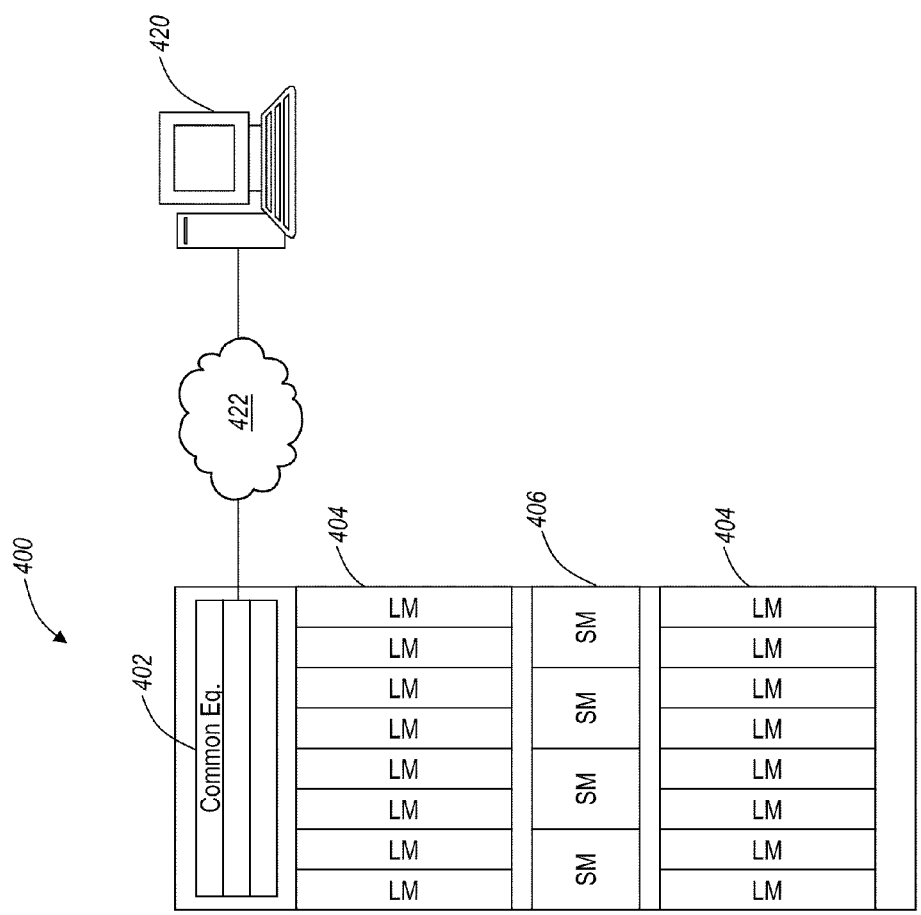
FIG. 4 is a diagram of a multi-service, multi-protocol switch that can implement the latency measurement of FIG. 3 according to an exemplary embodiment of the present invention.

Referring to FIG. 4, in an exemplary embodiment, a multi-service, multi-protocol switch 400 that can implement the latency measurement 310 is illustrated. For example, the switch 400 may include an optical switch network element (NE) that can consolidate the functionality of a multi-service provisioning platform (MSPP), digital cross connect (DCS), Ethernet and Optical Transport Network (OTN) switch, into a single, high-capacity intelligent switching system. Alternatively, the switch 400 may include any of a MSPP, DCS, OTN switch, Ethernet switch, SONET/SDH switch, Internet Protocol (IP) router, and the like. Generally, the switch 400 includes common equipment 402, line modules 404, and switch modules 406. The common equipment 402 can include power, a control module, operations, administration, maintenance, and provisioning (OAM&P) access, and the like. For example, the common equipment 402 may connect to a management system 420 through a data communications network 422. The management system 420 may include a network management system (NMS), element management system (EMS), operational support system (OSS), craft interface (CI), and the like. Those of ordinary skill in the art will recognize the switch 400 is shown for exemplary illustration purposes and those will understand the present invention contemplates operation with any network device that includes overhead for monitoring and communicating latency information. Further, the switch 400 may include other embodiments and/or components not illustrated herein for simplicity.

The line modules 404 may be communicatively coupled to the switch modules 406, such as through a backplane, midplane, or the like. The line modules 404 are configured to provide ingress and egress to the switch modules 406, and are configured to provide interfaces for the services described herein. For example, the line modules 1404 can include optical transceivers, such as, for example, 2.5 Gb/s (OC-48/STM-1, OTU1), 10 Gb/s (OC-192/STM-64, OTU2), 40 Gb/s (OC-768/STM-256, OTU3), 100 Gb/s (OTU4), etc. The line modules 404 can include DWDM interfaces, short reach interfaces, and the like, and can connect to other line modules 404 on remote NEs, end clients, and the like. Specifically, the latency measurement 310 may be configured to calculate latency on links created by interconnections of the line modules 404 over a transport network. The switch modules 406 may be configured to switch services between the line modules 404. For example, the switch modules 406 may provide wavelength granularity, SONET/SDH granularity, OTN granularity, Ethernet granularity, and the like. The switch modules 406 may include redundancy as well.

The latency measurement 310 may be implemented on the switch 400 through a combination of hardware, software, and/or firmware. In an exemplary embodiment, any of the common equipment 402, the line modules 404, and the switch modules 406 are configured to implement the latency measurement 310 and report results to other switches 400, to the management system 420, etc. In one exemplary embodiment, the management system 420 may be configured to trigger the latency measurement 310. Alternatively, the common equipment 402 may be configured to operate a control plane that triggers the latency measurement 310 responsive to various situations (e.g. route additions, route modifications, route deletions, etc.). Collectively, the line modules 404 and the switch modules 406 may be configured to frame signals and manipulate overhead (e.g. OTN, SONET, SDH, etc.). This may include the timers and the various latency measurement commands in the latency measurement 310. In one exemplary embodiment, the line modules 404 and the switch modules 406 may provide the timers and the commands, and the common equipment 402 may calculate the latency as described in the latency measurement 310.

Figure 5:
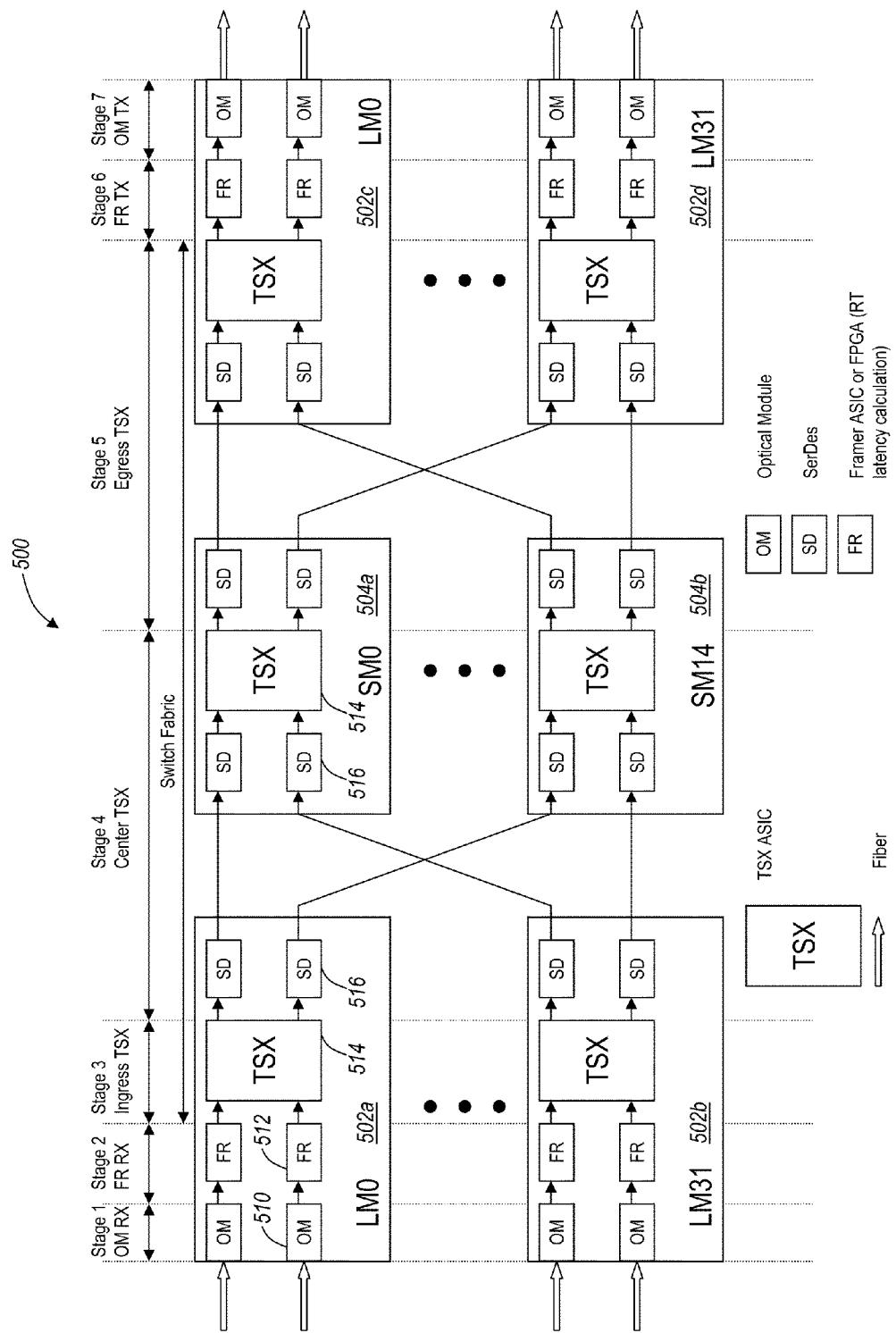
FIG. 5 is a diagram of a switch configuration for measuring latency on any line according to an exemplary embodiment of the present invention.

Referring to FIG. 5, in an exemplary embodiment, a diagram illustrates a switch configuration 500 for measuring latency on any line. Similar to FIG. 4, the configuration 500 provides an exemplary hardware configuration for implementing the latency measurement 310 and those of ordinary skill in the art will recognize the latency measurement 310 may be implemented on other switch configurations. The switch configuration 500 is a three stage Clos switch with line modules 502a, 502b, 502c, 502d interconnected with switch modules 504a, 504b. In this configuration, the line modules 502 include a total of 32 modules and the switch modules 504 include a total of 14 modules, and those of ordinary skill in the art will understand this is merely one exemplary embodiment contemplated by the present invention. The line modules 502a, 502b are ingress modules and the line modules 502c, 502d are egress modules. The line modules 502 generally include optical modules 510, framing circuitry 512, a time-space switching (TSX) application specific integrated circuit (ASIC) 514, and serializer-deserializer (SerDes) circuits 516. The switch modules 504 generally include the TSX ASIC 514 and SerDes circuits 516. Note, in the Clos architecture, the line modules 502 and the switch modules 504 each form various switching stages to provide a fully non-blocking switch. In an exemplary embodiment, the framing circuitry 512 is an ASIC and/or FPGA that includes circuitry and software instructions to implement the latency calculation 310. Specifically, this circuitry 512 is configured to calculate in real-time the latency to a corresponding line module 502 on another switch configuration 500 separated by an optical link in a network. This includes circuitry for implementing the timers, the associated commands, and the latency calculation. In another exemplary embodiment, the present invention can be extended to a path—similar to a supervisory unequipped mode that can be directed toward a switch fabric (or toward the fiber to source a test circuit) to test new circuit provisioning or to validate total switch latency (i.e. end-to-end from ingress port to egress port and back).

Figure 6:
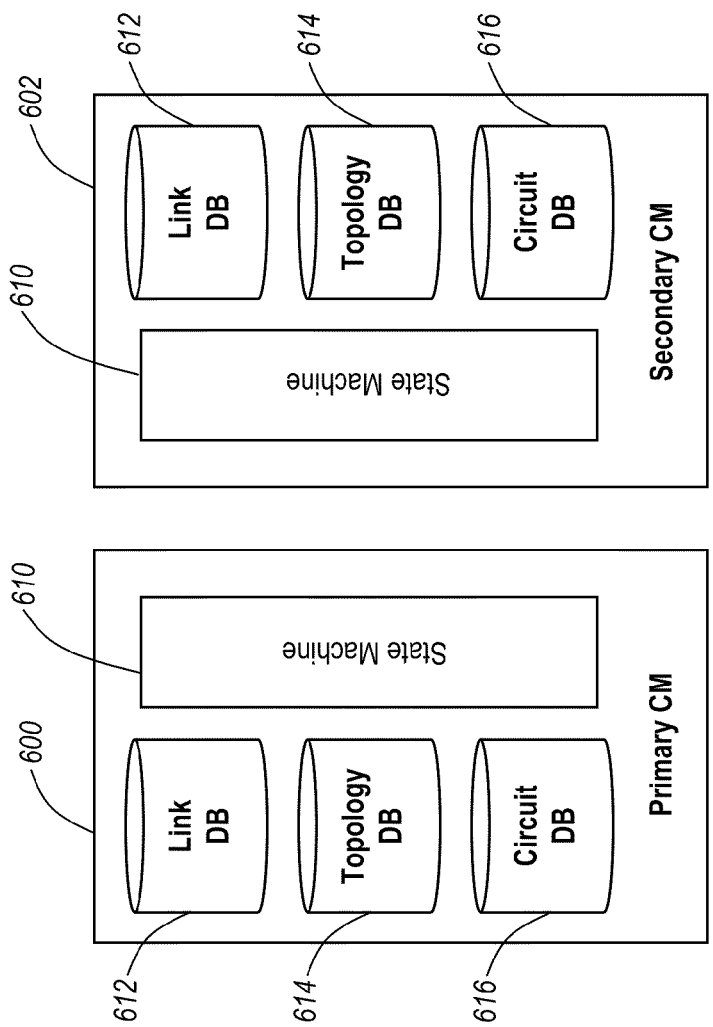
FIG. 6 is a diagram of redundant control modules (CMs) providing control plane processing with real-time latency measurements according to an exemplary embodiment of the present invention.

Referring to FIG. 6, in an exemplary embodiment, redundant control modules (CMs) 600, 602 are illustrated to provide control plane processing with real-time latency measurements. For example, the CMs 600, 602 may be part of common equipment, such as common equipment 402 in the switch 400 of FIG. 4. The CMs 600, 602 may include a processor which is hardware device for executing software instructions. The processor may be any custom made or commercially available processor, a central processing unit (CPU), an auxiliary processor among several processors associated with the CMs 600, 602, a semiconductor-based microprocessor (in the form of a microchip or chip set), an ASIC, a FPGA, or generally any device for executing software instructions. When the CM 600, 602 is in operation, the processor is configured to execute software stored within memory, to communicate data to and from the memory, and to generally control operations of the CM 600, 602 pursuant to the software instructions.

The CMs 600, 602 may also include network interfaces, a data store, memory, and the like. The network interfaces may be used to enable the CMs 600, 602 to communicate on a data communication network, such as to communicate control plane information to other CMs 600, 602. The network interfaces may include, for example, an Ethernet card (e.g., 10 BaseT, Fast Ethernet, Gigabit Ethernet) or a wireless local area network (WLAN) card (e.g., 802.11a/b/g). The network interfaces may include address, control, and/or data connections to enable appropriate communications on the network. Also, the CMs 600, 602 may be configured to communicate over overhead associated with a protocol (e.g. OTN, SONET, SDH, etc.). The data store may be used to store data, such as control plane information received from NEs, other CMs 600, 602, etc. The data store can may any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory can have a distributed architecture, where various components are situated remotely from one another, but can be accessed by the processor.

Each of the CMs 600, 602 include a state machine 610, a link database (DB) 612, a topology DB 614, and a circuit DB 616. The CMs 600, 602 are responsible for all control plane processing, e.g. OSRP, associated with a network. The CMs 600, 602 may be configured in a redundant 1+1, 1:1, etc. configuration. The state machine 610 is configured to implement the control plane in its various functions. The DBs 612, 614, 616 may be stored in the memory and/or data store. The link DB 612 includes updated information related to each link in a network. The topology DB 614 includes updated information related to the network topology, and the circuit DB 616 includes a listing of terminating circuits and transiting circuits at an NE where the CMs 600, 602 are located. The CMs 600, 602 can utilize control plane mechanisms to maintain the DBs 612, 614, 616. For example, a HELLO protocol may be used to discover and verify neighboring ports, nodes, protection bundles, and the like. Also, the DBs 612, 614, 616 may share topology state messages to exchange information to maintain identical data. In an exemplary embodiment, the latency measurement 310 may be incorporated into the control plane and the CMs 600, 602. Specifically, the latency measurement 310 may be utilized in the DBs 612, 614, 616 to assign admin weights to links based on the results of the latency measurement 310. Also, the CMs 600, 602 may include various algorithms as to control timing and implementation of the latency measurement 310. For example, this may include initiating the latency measurement 310 on all new routes, on any changed route, etc. Also, since the latency measurement 310 may be performed in-service without affecting a route, the CMs 600, 602 may be configured to periodically implement latency measurements 310 for all provisioned routes to maintain updated admin weights.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A latency measurement method over an optical link, comprising:
    issuing a latency measurement command at a first node to a second node and starting a first timer;
    receiving the latency measurement command at the second node and starting a second timer;
    stopping the second timer and issuing a latency measurement response at the second node to the first node;
    receiving the latency measurement response at the first node and stopping the first timer; and
    calculating latency between the first node and the second node based on the first timer and the second timer;
    wherein the calculating latency is further based on a granularity derived from a bit rate of transmission between the first node and the second node.

2. The latency measurement method of claim 1, further comprising:
    transmitting a value of the second timer from the second node to the first node, wherein the calculating latency is performed at the first node.

3. The latency measurement method of claim 2, wherein the value of the second timer is transmitted in overhead associated with a transmission protocol.

4. The latency measurement method of claim 1, wherein the first timer and the second time are utilized in the calculating latency to remove frame skew associated between the first node and the second node from the latency.

5. The latency measurement method of claim 1, wherein the calculating latency is based on a formula of:

$$\text{Latency} = \left(\frac{Timer_1 - Timer_2}{2}\right) \cdot TickGranularity$$

where $Timer_1$ comprises a value of the first timer, $Timer_2$ comprises a value of the second timer, and TickGranularity is derived from the bit rate.

6. The latency measurement method of claim 1, wherein the latency measurement method is performed in-service across the optical link.

7. The latency measurement method of claim 6, wherein the latency measurement command and the latency measurement response are transmitted in overhead associated with a transmission protocol.

8. The latency measurement method of claim 1, further comprising:
operating an optical network comprising at least the first node and the second node, wherein the optical network utilizes a signaling and routing protocol; and
automatically setting administrative weights associated with a plurality of links in the optical network based upon latency measurements.

9. The latency measurement method of claim 8, further comprising:
operating the latency measurement method in-service utilizing overhead associated with a transmission protocol; and
periodically adjusting the administrative weights based on updated latency measurements.

10. The latency measurement method of claim 1, further comprising:
operating an optical network comprising at least the first node and the second node, wherein the optical network utilizes a signaling and routing protocol;
operating the latency measurement method in-service utilizing overhead associated with a transmission protocol;
automatically detecting a change in latency on clearing of a Signal Fail or a remote Signal Fail; and
adjusting administrative weights based on the change in latency.

11. The latency measurement method of claim 1, further comprising:
operating an optical network comprising at least the first node and the second node, wherein the optical network utilizes a signaling and routing protocol;
operating the latency measurement method in-service utilizing overhead associated with a transmission protocol; and
detecting significant latency difference between multiple lines on a same link.

12. The latency measurement method of claim 1, further comprising:
operating an optical network comprising at least the first node and the second node, wherein the optical network utilizes a signaling and routing protocol;
operating the latency measurement method in-service utilizing overhead associated with a transmission protocol; and
providing a line latency performance monitoring statistic.

13. A network, comprising:
a plurality of nodes;
a plurality of links interconnecting the plurality of nodes;
a transmission protocol operating on the plurality of links between the plurality of nodes; and
a real-time latency measurement algorithm configured to in-service measure latency of any of the plurality of links between any of the plurality of nodes filtering out frame skew between the plurality of nodes;
wherein the latency measurement is further based on a granularity derived from a bit rate of transmission between the plurality of nodes.

14. The network of claim 13, further comprising:
a signaling and routing protocol operating on the plurality of nodes, wherein the real-time latency measurement algorithm is configured to automatically provide administrative weights for each of the plurality of links and to periodically adjust the administrative weights based on updated measurements.

15. The network of claim 13, wherein the real-time latency measurement algorithm transmits commands and timer values in minimal overhead associated with the transmission protocol.

16. A network element, comprising:
a module comprising an optical transceiver connected to a transport network and framing circuitry configured to provide framing based on a transmission protocol; and
a real-time latency measurement algorithm;
wherein the module is configured to connect to a second module in a second network element over the transport network; and
wherein the real-time latency measurement algorithm is configured to measure in-service and in real-time latency associated with a link formed by the module and the second module, wherein the real-time latency measurement algorithm is further configured to filter out frame skew associated with the module and the second module; and wherein the latency measurement is further based on a granularity derived from a bit rate of transmission between the module and the second module.

17. The network element of claim 16, wherein the real-time latency measurement algorithm comprises the steps of:
issuing a latency measurement command at the module to the second module and starting a first timer, wherein the second module is configured to start a second timer upon receipt of the latency measurement command;
receiving the latency measurement response and a value of the second time at the module and stopping the first timer; and
calculating latency between the module and the second module based on the first timer and the second timer.

18. The network element of claim 17, wherein the calculating latency is based on a formula of:

$$\text{Latency} = \left(\frac{Timer_1 - Timer_2}{2}\right) \cdot TickGranularity$$

where $Timer_1$ comprises a value of the first timer, $Timer_2$ comprises a value of the second timer, and TickGranularity is derived from the bit rate.

19. The network element of claim 16, further comprising:
a signaling and routing protocol operating at the network element;
wherein administrative weights associated with links connected to the optical transceiver are defined based on the real-time latency measurement algorithm.

* * * * *